US009957985B2

(12) United States Patent
Coles et al.

(10) Patent No.: US 9,957,985 B2
(45) Date of Patent: May 1, 2018

(54) FASTENER

(71) Applicant: HCL FASTENERS LIMITED, Radstock, Bath (GB)

(72) Inventors: David Coles, Bath (GB); Benjamin Beckett, Radstock (GB); Ashley Vearncombe, Axbridge (GB)

(73) Assignee: HCL FASTENERS LIMITED, Radstock, Bath (GB)

( * ) Notice: Subject to any disclaimer, the term of this patent is extended or adjusted under 35 U.S.C. 154(b) by 192 days.

(21) Appl. No.: 14/899,033

(22) PCT Filed: May 9, 2014

(86) PCT No.: PCT/GB2014/051418
§ 371 (c)(1),
(2) Date: Dec. 16, 2015

(87) PCT Pub. No.: WO2014/202944
PCT Pub. Date: Dec. 24, 2014

(65) Prior Publication Data
US 2016/0123359 A1    May 5, 2016

(30) Foreign Application Priority Data

Jun. 18, 2013   (GB) .................................. 1310807.1

(51) Int. Cl.
F16B 2/08        (2006.01)
B65D 63/14       (2006.01)
(Continued)

(52) U.S. Cl.
CPC ................ F16B 2/08 (2013.01); A44B 11/06 (2013.01); A44B 11/12 (2013.01); B65D 63/14 (2013.01); F16B 2/185 (2013.01)

(58) Field of Classification Search
CPC ..... A44B 11/006; A44B 11/06; A44B 11/065; A44B 11/258; A44B 11/2588;
(Continued)

(56) References Cited

U.S. PATENT DOCUMENTS 139,460 A *  6/1873  Fairman .................. E05F 11/00
                                                    24/167
291,150 A *  1/1884  Chandler ............... A44B 11/06
                                                    24/168
(Continued)

FOREIGN PATENT DOCUMENTS

EP   0 145 110 A1   6/1985
FR   2079570 A5     11/1971
(Continued)

OTHER PUBLICATIONS

Search Report in GB1310807.1, dated Oct. 21, 2013.
Int'l Search Report & Written Opinion in PCT/GB2014/051418, dated Aug. 5, 2014.

Primary Examiner — Jack W Lavinder
(74) Attorney, Agent, or Firm — Mossman, Kumar & Tyler, PC

(57) ABSTRACT

The present invention relates to a fastener (1) comprising a band (2) and a holding member (8). The band (2) having a first end (3) and a second end (4), and an inwardly facing surface (5) and an outwardly facing surface (6) extending therebetween. Teeth (7) are provided on the inwardly facing surface (5) and outwardly facing surface (6) at least the first (3) and second (4) ends of the band (2). A holding member (8) for holding the band (2) in a closed loop such that the holding member (8) is arranged to engage the teeth (7) provided by the inwardly facing surface (5) or the outwardly facing surface (6) at least the first end (3) of the band (2) with the teeth (7) provided by the outwardly facing surface
(Continued)

(6) or the inwardly facing surface (5) respectively at least the second end (4) of the band (2).

10 Claims, 7 Drawing Sheets

(51) Int. Cl.
*A44B 11/06* (2006.01)
*A44B 11/12* (2006.01)
*F16B 2/18* (2006.01)

(58) Field of Classification Search
CPC . A44B 11/2584; A44B 11/2553; F16B 2/065; B65D 63/14; B65D 63/16; B65D 63/1018; Y10T 24/4012; Y10T 24/27; Y10T 24/2708; Y10T 24/45623; Y10T 24/1402; Y10T 24/141; Y10T 24/33; A41F 9/002; A44D 2211/02
USPC .............. 24/68 E, 17 A, 17 AP, 278, 20 LS; 292/328, 307 R
See application file for complete search history.

(56) References Cited

U.S. PATENT DOCUMENTS

| | | | | |
|---|---|---|---|---|
| 855,675 A * | 6/1907 | Skinner | ............... | A01K 1/04 24/168 |
| 909,399 A * | 1/1909 | Greenwood | ....... | B65D 63/1018 24/17 A |
| 1,037,613 A * | 9/1912 | Gizzi | ................ | A01K 1/04 24/168 |
| 1,210,040 A * | 12/1916 | Brittain | ............... | B65D 63/10 24/17 R |
| 1,911,060 A * | 5/1933 | Greely | ................ | G09F 3/0352 292/307 R |
| 2,988,391 A * | 6/1961 | Erke | ................ | B65D 63/06 292/325 |
| 3,112,496 A * | 12/1963 | Dritz | ................ | A41F 9/002 2/322 |
| 3,653,099 A | 4/1972 | Hoffman | | |
| 3,747,164 A * | 7/1973 | Fortsch | ........... | B65D 63/1081 24/16 PB |
| 5,208,952 A * | 5/1993 | Mintel | ............... | A43C 11/00 24/584.1 |
| 5,548,878 A * | 8/1996 | Romagnoli | ........ | A44B 11/258 24/168 |
| 5,758,443 A | 6/1998 | Pedrazzini | | |
| 8,978,210 B2 * | 3/2015 | Arjomand | ........... | B65D 63/14 24/16 PB |
| 9,643,763 B2 * | 5/2017 | Kierstead | .......... | B65D 63/1027 |
| 2007/0067965 A1* | 3/2007 | Sugiyama | .......... | B65D 63/14 24/16 PB |
| 2013/0291343 A1* | 11/2013 | Arjomand | ......... | B65D 63/1027 24/16 R |

FOREIGN PATENT DOCUMENTS

| | | |
|---|---|---|
| GB | 2336622 A | 10/1999 |
| JP | S53 37089 U | 4/1978 |
| WO | 2005037673 A1 | 4/2005 |

* cited by examiner

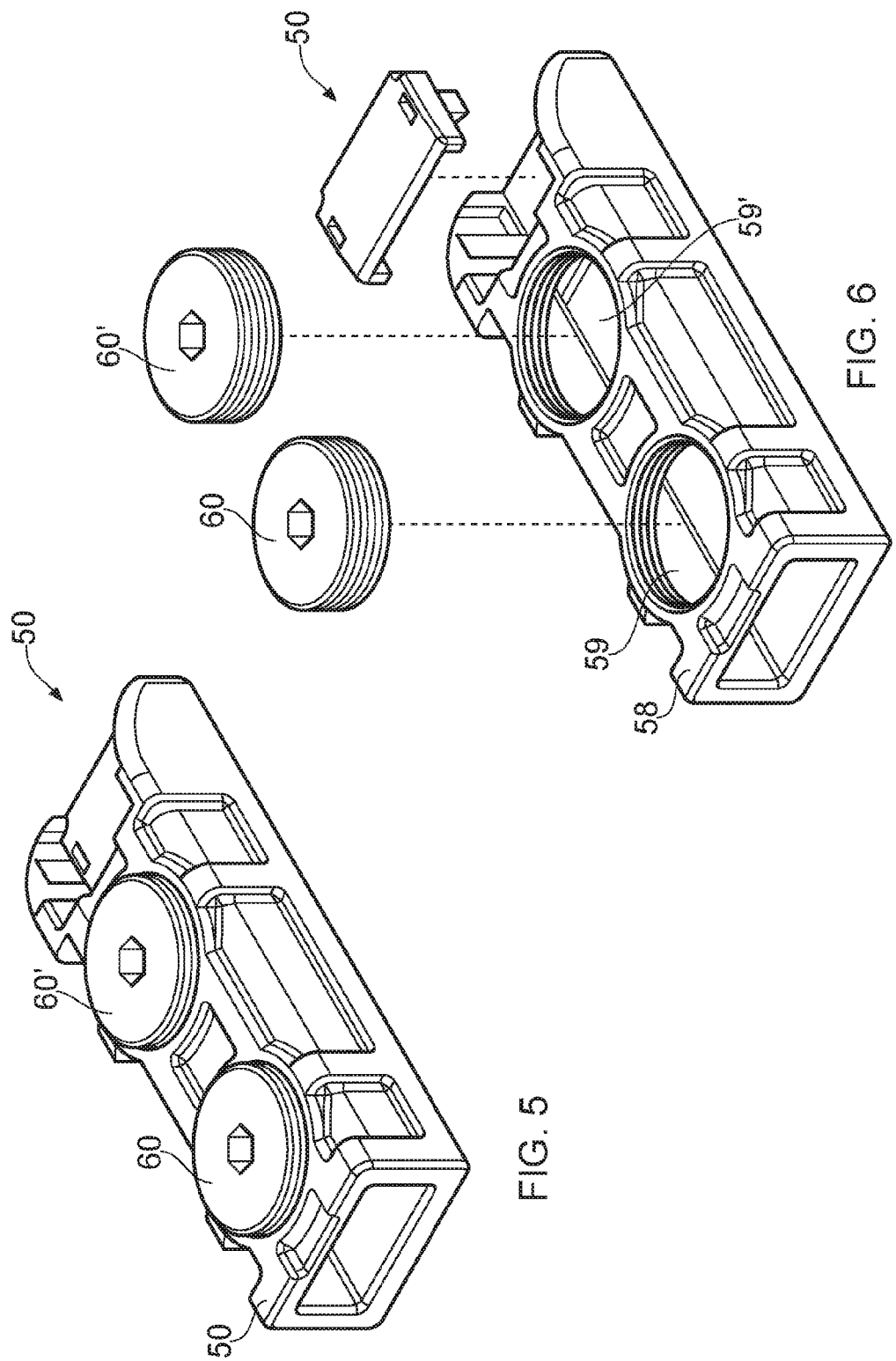

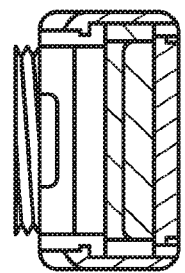
SECTION A-A
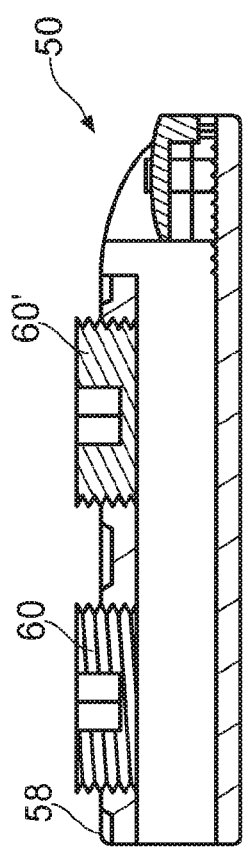
FIG. 7A
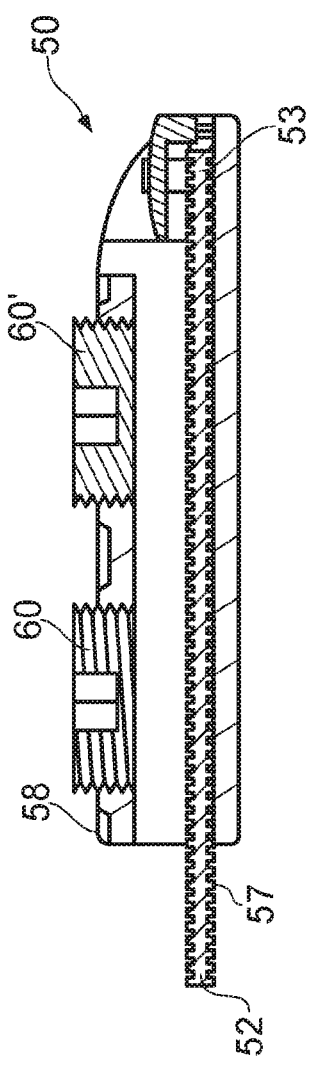
FIG. 7B
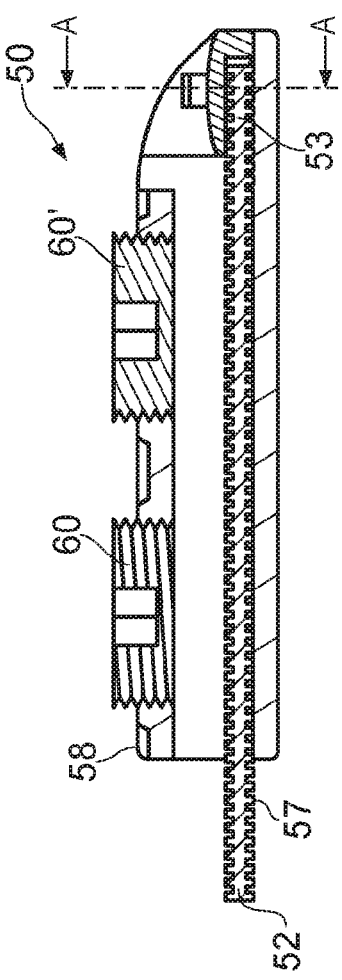
FIG. 7C

DETAIL B

FASTENER

The present invention relates to a fastener comprising a band and a holding member for securing the band in a closed loop around an object, and to a method for securing the fastener around an object.

BACKGROUND OF THE INVENTION

An example of a known fastener is shown in European Patent Application EP1817240 which describes a fastener comprising a band and a head for holding the band in a closed loop. The band comprises a plurality of teeth on one side of the band. The head comprises passageways for receiving the ends of the band. Each passageway comprises at least one tooth which is arranged to engage the teeth on the ends of the band and prevent the band from being removed from the head.

SUMMARY OF THE INVENTION

According to a first aspect of the present invention, there is provided a fastener comprising:

an elongate band having a first end region and a second end region, the band having an inwardly facing surface and an outwardly facing surface extending between the first and second end regions, the inwardly facing surface and outwardly facing surface defining respective pluralities of teeth thereon, such teeth being located at least in the vicinities of the first and second end regions of the band; and a holding member for holding the band in a closed loop, the holding member comprising a securing element arranged to secure the first and second end regions of the band within the holding member such that the at least some of the teeth on the inwardly facing surface engage with at least some of the teeth on the outwardly facing surface of the band.

According to a second aspect of the present invention, there is provided a method of securing a fastener as claimed in any one of claims 1 to 16 around at least one object, the method comprising the steps of inserting the first end region of the band into the holding member; forming the band into a loop; passing the second end of the band through the holding member adjacent the first end region of the band; and securing the first and second end regions of the band within the holding member such that the at least some of the teeth on the inwardly facing surface engage with at least some of the teeth on the outwardly facing surface of the band.

The band may provide teeth on the inwardly facing surface and/or the outwardly facing surface along the length of the band between the first and second ends of the band. The band may be formed of any suitable resilient material, such as for example polyamides 11 and 12.

When the band is in a closed loop the first end and the second end of the band preferably overlap. As a result of the overlap the fastener of the invention has improved strength. The first end and the second end of the band preferably overlap by at least 40 mm, for example by at least 80 mm when forming the closed loop. The amount of overlap between the first and second ends may of course vary depending on the intended use of the band. A first end of the holding member may provide a first opening for receiving the first end of the band. A second end of the holding member may provide a second opening for receiving the second end of the band. The first and second openings are preferably in communication with a chamber for receiving the first and second ends of the band.

The first and second openings are preferably provided at opposing ends of the holding member.

The holding member may further comprise at least one engagement member for releaseably securing the first end of the band within the chamber. The engagement member(s) may be any suitable mechanism for releaseably securing the first end of the band member within the chamber, such as for example a clamp or a screw mechanism.

The at least one engagement member may be located at or adjacent to the second end of the holding member.

The at least one engagement member is preferably moveable in a direction extending substantially perpendicular to the axis of the chamber extending between the first and second ends of the holding member so as to releasably secure the first end of the band.

The holding member preferably comprises an inner surface configured to be directed towards the inside of the loop when formed and an outer surface opposed to the inner face. The outer surface may provide at least one access opening providing access to the chamber.

The at least one access opening extends in a direction substantially perpendicular to the first and second openings of the holding member. The holding member may comprise any suitable number of access openings. The holding member may for example comprise a plurality of spaced apart access openings. The access openings may be spaced apart in a direction extending between the first and second ends of the holding member. For example, the outer surface of the holding member comprises two spaced apart access openings.

The holding member may further comprise at least one locking mechanism. The at least one locking mechanism may be arranged to be received within and movable through the at least one access opening. Each locking mechanism is preferably moveable between an engaged position in which each locking mechanism is arranged such that teeth of the first and second bands are engaged, and a disengaged position in which each locking mechanism is arranged such that the teeth of the first and second bands are disengaged. Each locking mechanism may be moved between the disengaged position and the engaged position by rotation of the at least one locking mechanism relative to the holding member.

The at least one locking mechanism may be moveable between the engaged and disengaged positions in a direction extending substantially perpendicular to the axis of the chamber extending between the first and second ends of the holding member. The at least one locking mechanism may comprise a cam lever locking mechanism.

The at least one access opening preferably comprises a threaded portion. The at least one locking mechanism may comprise a threaded member for engagement with the threaded portion of the access opening.

The fastener is preferably secured to an object in a subsea environment. The fastener may however also be used in non-subsea environments. The fastener may be re-usable. The method may further comprise engaging at least one engagement member of the holding member with the first end of the band within the chamber so as to releaseably securing the first end of the band. The first end of the band is preferably releasably secured by displacement of the at least one engagement member in a direction extending substantially perpendicular to the axis extending between the first and second openings of the holding member.

The step of engaging the at least one engagement member with the first end of the band is preferably carried out prior to subsea deployment of the fastener. This step may however be carried out in a subsea environment by a diver or an ROV ('remotely operated vehicle').

BRIEF DESCRIPTION OF THE DRAWINGS

FIG. 5 illustrates a perspective view of a fastener according to a further embodiment of the present invention;

FIG. 6 illustrates an exploded view of the fastener of FIG. 4; and

FIGS. 7A to 7F illustrate schematic views of the fastener of FIG. 4 in different stages during the method of securing the fastener to an object.

DETAILED DESCRIPTION OF THE PREFERRED EMBODIMENTS

Figure 2:
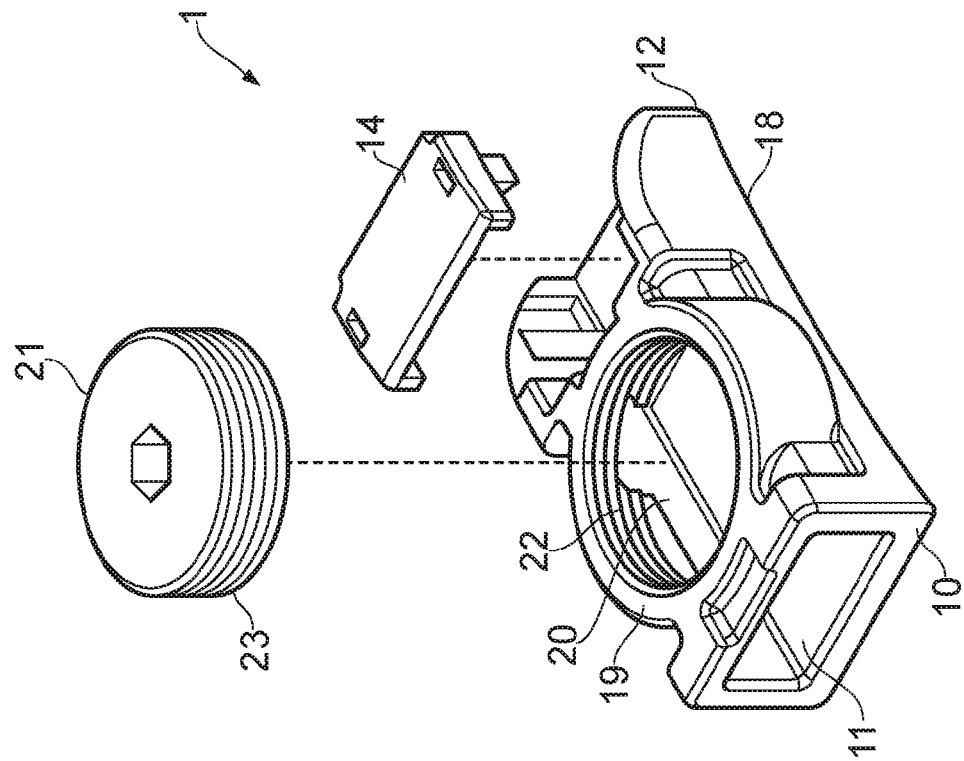
FIG. 2 illustrates an exploded view of the fastener of FIG. 1.
Figure 1:
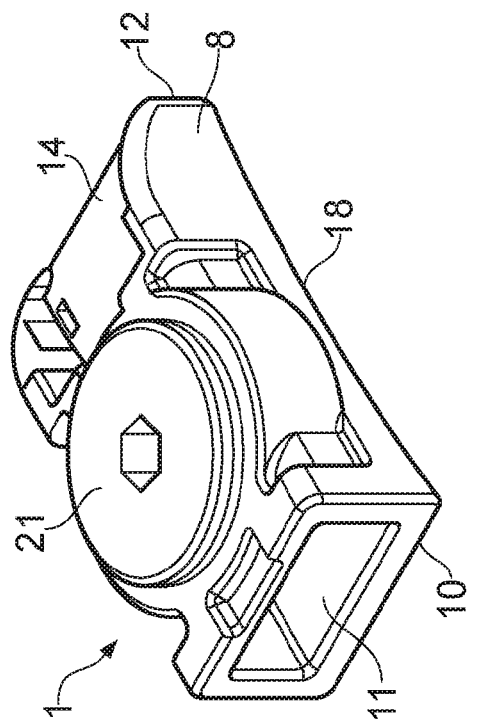
FIG. 1 illustrates a perspective view of a fastener according to a first embodiment of the present invention.
Figure 3A:
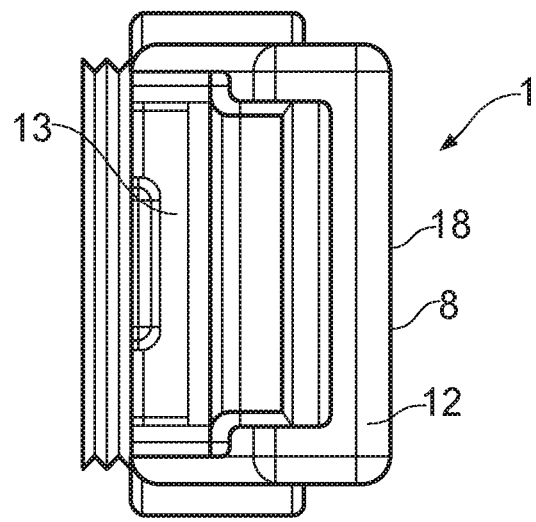
FIGS. 3A and 3B illustrate a schematic view of the first and second ends of the holding member of the fastener of FIG. 1.
Figure 3B:
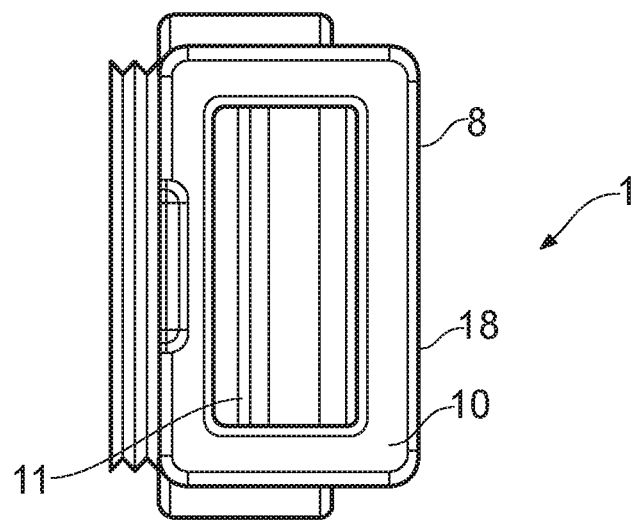

With reference to FIGS. 1, 2, 3A-B and 4A-4F, the fastener 1 comprises a band 2 having a first end 3 and a second end 4. The band 2 has an inwardly facing surface 5 and an outwardly facing surface 6 extending between the first end 3 and the second end 4 of the band 2. Teeth 7 are provided on the inwardly facing surface 5 and outwardly facing surface 6 along the length of the band 2 between the first end 3 and the second end 4 of the band 2. The teeth 7 are provided in a continuous arrangement along the length of the inwardly facing surface 5 and the outwardly facing surface 6 of the band 2. It is however to be understood that the teeth 7 may be provided in discrete separate regions along the length of the inwardly facing surface 5 and the outwardly facing surface 6 of the band 2.

The fastener 1 further comprises a holding member 8 for holding the band 2 in a closed loop such that the holding member 8 is arranged to engage the teeth 7 provided by the inwardly facing surface 5 or the outwardly facing surface 6 at the first end 3 of the band 2 with the teeth 7 provided by the outwardly facing surface 6 or the inwardly facing surface 5 respectively at the second end 4 of the band 2.

Figure 4A:
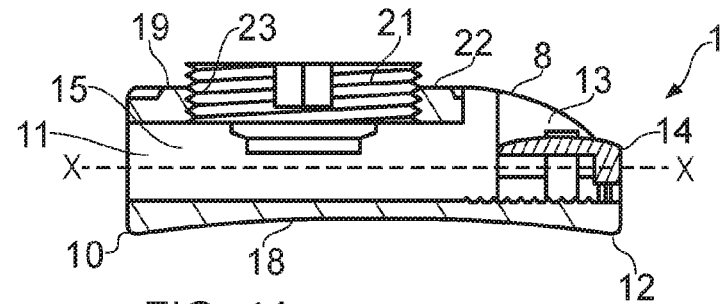
FIGS. 4A to 4F illustrate schematic views of the fastener of FIG. 1 in different stages during the method of securing the fastener to an object.
Figure 4B:
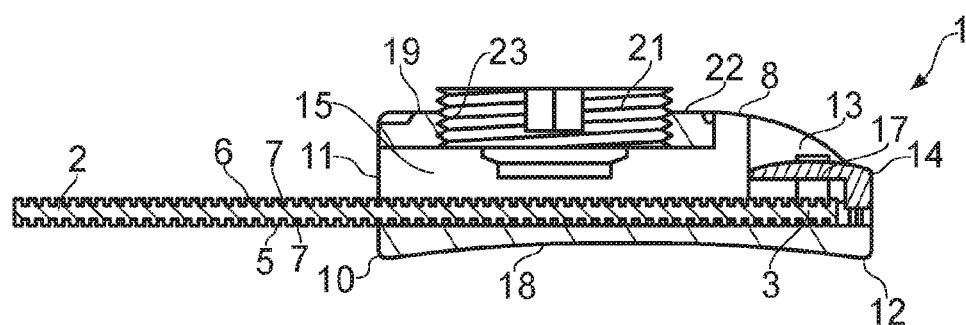

A first end 10 of the holding member 8 provides a first opening 11 for receiving the first end 3 of the band 2. A second end 12 of the holding member 8 provides a second opening 13 for receiving the second end 4 of the band 2. The first opening 11 and the second opening 13 may have any suitable shape and dimensions for receiving the band 2. In FIGS. 4A and 4B it can be seen that the first opening 11 and the second opening 13 are substantially rectangular in shape. The first 11 and second 13 openings are in communication with a chamber 13 for receiving the first 3 and second 4 ends of the band 2. The first opening 11 and the second opening 13 are provided at opposing ends 10, 12 of the holding member 8. It is to be understood that the openings 11 and 13 can be provided at any suitable location on the holding member 8 provided the teeth 7 provided by the first end 3 and second end 4 of the band 2 are able to engage each other.

The holding member 8 further comprises an engagement member 14 for releaseably securing the first end 3 of the band 2 within the chamber 15. The engagement member 14 is a clamp 16. The clamp 16 is located at the second end 12 of the holding member 8. The clamp 16 is moveable in a direction extending substantially perpendicular to the axis X-X' of the chamber 15 extending between the first 10 and second 12 ends of the holding member 8 so as to releasably secure the first end 3 of the band 2. The clamp 16 comprises an abutment surface 17 for engaging the outwardly facing surface 6 at the first end 3 of the band 2.

The holding member 8 comprises an inner surface 18 configured to be directed towards the inside of the loop when formed and an outer surface 19 opposed to the inner surface 18. The outer surface 19 provides an access opening 20 providing access to the chamber 15. The access opening 20 is substantially circular in shape. It is however to be understood that the access opening 20 may have any suitable shape for providing access to the chamber 15.

The access opening 20 extends in a direction substantially perpendicular to the first 11 and second 13 openings of the holding member 8. The holding member 8 further comprises a locking mechanism 21. The locking mechanism 21 is arranged to be received within and movable through the access opening 20. The locking mechanism 21 is therefore substantially circular in cross-section.

The locking mechanism 21 is moveable between an engaged position in which the locking mechanism 21 is arranged such that teeth 7 of the first 3 and second 4 ends of the band 2 are engaged, and a disengaged position in which the locking mechanism 21 is arranged such that the teeth 7 of the first 3 and second ends 4 of the band 2 are disengaged.

The locking mechanism 21 is moveable between the engaged and disengaged positions in a direction extending substantially perpendicular to the axis X-X' of the chamber 15 extending between the first 11 and second 12 openings of the holding member 8.

The access opening 20 comprises a threaded portion 22. The locking mechanism 21 comprises a threaded member 23 for engagement with the threaded portion 22 of the access opening 20.

With reference to FIGS. 4A to 4F, there is shown a fastener 1 made up of a band 2 and a holding member 8. Although it is not immediately evident from FIGS. 4A to 4F, the band 2 is formed in a closed loop for encircling an article to be clamped or secured.

As shown in FIG. 4B, in order to secure the fastener 1, a first end 3 of the band 2 is slid through first opening 11 of the holding member 8. The first end 3 of the band 2 is slid into the chamber 15 until it reaches clamp 16.

Figure 4C:
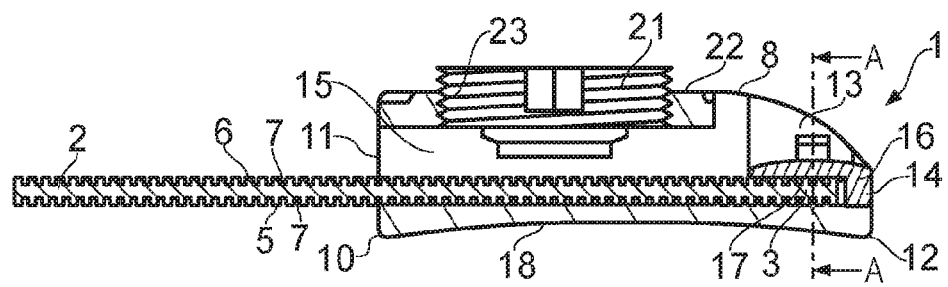

As shown in FIG. 4C, the clamp 16 is then displaced in a direction extending substantially perpendicular to the axis X-X' extending between the first and second openings 11 and 12 of the holding member 8. The clamp 16 is displaced until the abutment surface 17 abuts the teeth 7 provided by the outwardly facing surface 6 of the first end 3 of the band 2. The clamp 16 therefore engages the first end 3 of the band 2 and retains the first end 3 in position within the holding member 8. The first end 3 of the band 2 is secured in position within the holding member 8 prior to deployment in an underwater environment. This simplifies the process of securing the fastener 1 to the object.

Figure 4D:
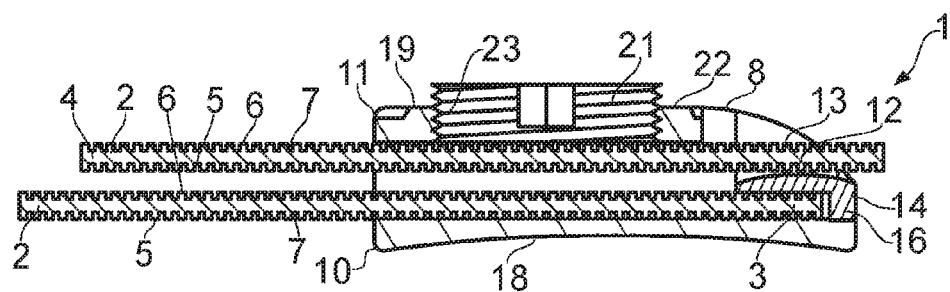

As shown in FIG. 4D, the band 2 is then looped around the object and the second end 4 is inserted through the second opening 12 of the holding member 8. The second end 4 of the band 1 is inserted into and through chamber 15 of the holding member 8. The inwardly facing surface 5 of the second end 4 of the band 2 extends adjacent the outwardly facing surface 6 of the first end 3 of the band 2.

Figure 4E:
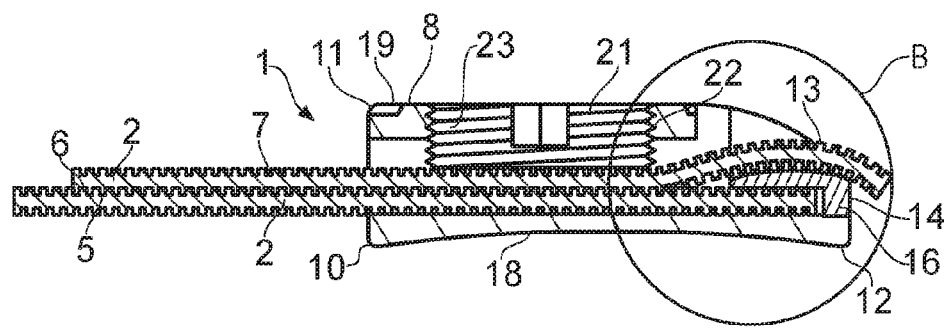

As shown in FIG. 4E, the locking mechanism 21 is then rotated relative to the holding member 8 so as to be displaced in a direction extending substantially perpendicular to the axis extending between the first opening 11 and second opening 12 of the holding member 8. Rotation of the locking mechanism 21 causes the threaded member 23 of the locking mechanism 21 to be displaced in a direction towards the band 2. The locking mechanism 21 is rotated until the teeth 7 provided by the inwardly facing surface 5 of the second end 4 of the band 2 engage with the teeth 7 provided by the outwardly facing surface 6 of the first end 3 of the band 2.

Figure 4F:
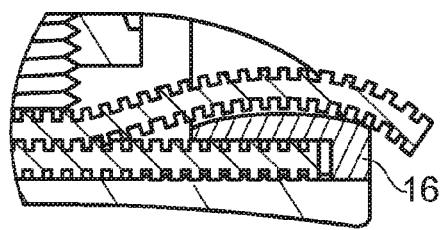
Figure 7D:
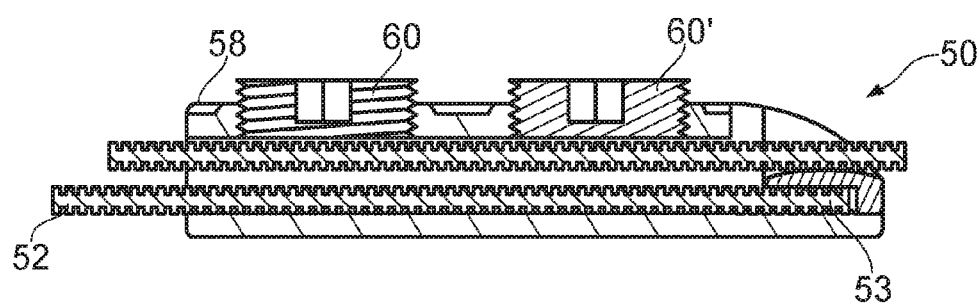
Figure 7E:
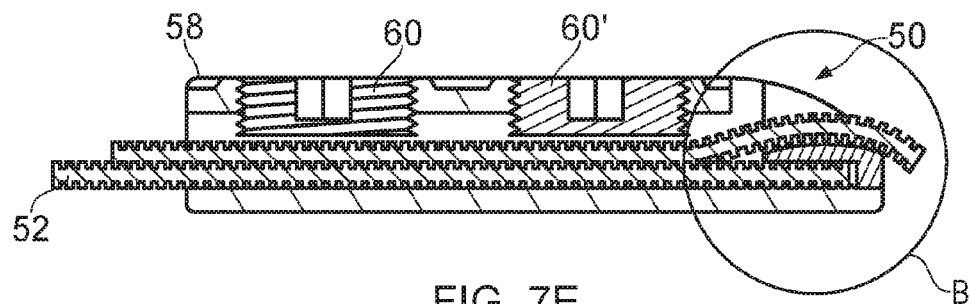
Figure 7F:
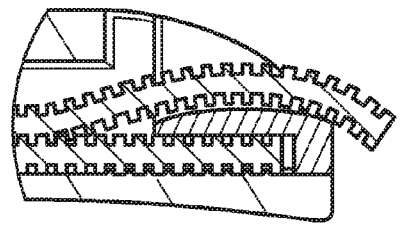

As shown in FIGS. 4E and 4F, the clamp 15 is shaped and dimensioned such that on insertion of the second end 4 of the band 2 into the holding member 8, the second end 4 is spaced apart from the first end 3 of the band 2. This ensures that the second end 4 can be inserted easily without the teeth 7 provided by the band 2 engaging with each other. The band 2 is formed of a resilient material, such that on engagement with the locking mechanism, the second end 4 of the band 2 is brought into contact with the first end 3 of the band.

FIGS. 5 to 7 and 8A-8F illustrate a further embodiment of the present invention in which the fastener 50 comprises a band 52 and a holding member 58. The fastener 50 is the differs from the fastener 1 of FIGS. 1 to 3 and 4A-4F in that the holding member 58 comprises two spaced apart access openings 59,59' and two locking mechanisms 60, 60' for engagement with the access openings 59,59'. The features of the holding member 58 and the band 52 and the relationship between these features have already been described in relation to the corresponding features of the embodiment of FIGS. 1 to 3 and 4A-4F. The fastener 50 therefore operates in a similar manner to the embodiment already described in relation to FIGS. 1 to 3 and 4A-4F.

In order to engage the teeth 57 provided by the second end 54 of the band 52 with the teeth 57 provided by the first end 53 of the band 52 both locking mechanisms 60,60' are rotated within the openings 59,59' relative to the holding member 58. The locking mechanisms 60,60' are therefore displaced in a direction towards band 52 until the locking mechanisms 60,60' abut the band 52 in two spaced apart locations along the length of the band 52. The presence of two locking mechanisms 60,60' provides a fastener 51 in which the engagement between the locking mechanisms 60,60' with the band 52 is significantly improved. By providing multiple locking mechanisms 60,60' the interlocking length of the bands is increased and as a result the interlocking strength is improved. The presence of at least one locking mechanism helps to reduce the risk of vibrations causing the locking mechanism 60,60' to be disengaged from the band 52 in an environment such as for example an underwater environment are reduced.

Although aspects of the invention have been described with reference to the embodiment shown in the accompanying drawings, it is to be understood that the invention is not limited to the precise embodiment shown and that various changes and modifications may be effected without further inventive skill and effort. For example, the fastener may be used to secure two separate bands together. For example, the first end of the band may be provided by a first band and the second end of the band may be provided by a separate second band.

The invention claimed is:

1. A fastener comprising:
an elongate band having a first end region and a second end region, the band having an inwardly facing surface and an outwardly facing surface extending between the first and second end regions, the inwardly facing surface and outwardly facing surface defining respective pluralities of teeth thereon, such teeth being located at least in the vicinities of the first and second end regions of the band; and
a holding member for holding the band in a closed loop, in which a first end of the holding member provides a first opening for receiving the first end of the band; and a second end of the holding member provides a second opening for receiving the second end of the band, and in which the first and second openings are in communication with a chamber for receiving the first and second ends of the band, and in which the holding member comprises an inner surface configured to be directed towards the inside of the loop when formed and an outer surface opposed to the inner face, and in which the outer surface provides at least one access opening providing access to the chamber, and in which the holding member further comprises at least one locking mechanism arranged to be received within and moveable through the at least one access opening, and in which each locking mechanism is moveable between an engaged position in which each locking mechanism is arranged such that at least some of the teeth on the inwardly facing surface engage with at least some of the teeth on the outwardly facing surface of the band, and a disengaged position in which the teeth on the inwardly facing surface are disengaged from the teeth on the outwardly facing surface of the band.

2. A fastener as claimed in claim 1, in which when the band is in a closed loop the first end and the second end of the band overlap.

3. A fastener as claimed in claim 1, in which the first and second openings are provided at opposing ends of the holding member.

4. A fastener as claimed in claim 1, in which the at least one access opening extends in a direction substantially perpendicular to the first and second openings of the holding member.

5. A fastener as claimed in claim 1, in which the at least one locking mechanism is moveable between the engaged and disengaged positions in a direction extending substantially perpendicular to the axis of the chamber extending between the first and second ends of the holding member.

6. A fastener as claimed in claim 1, in which the at least one access opening comprises a threaded portion, and in which the at least one locking mechanism comprises a threaded member for engagement with the threaded portion of the access opening.

7. A fastener as claimed in claim 1, in which the outer surface of the holding member comprises two spaced apart access openings.

8. A method of securing a fastener as claimed in claim 1 around at least one object, the method comprising the steps of:
inserting the first end region of the band into the holding member;
forming the band into a loop;
passing the second end of the band through the holding member adjacent the first end region of the band; and
securing the first and second end regions of the band within the holding member such that the at least some of the teeth on the inwardly facing surface engage with at least some of the teeth on the outwardly facing surface of the band, in which the teeth are engaged by displacing at least one locking mechanism from a disengaged position in which each locking mechanism is arranged such that teeth of the first and second end regions are disengaged to an engaged position in which each locking mechanism is arranged such that the teeth of the first and second end regions are engaged with one another.

9. A method as claimed in claim 8, in which each locking mechanism is moved between the disengaged position and the engaged position by rotation of the at least one locking mechanism.

10. A method as claimed in claim 8, in which the method is carried out in a subsea environment.

* * * * *